United States Patent
Czompo

(10) Patent No.: US 9,641,266 B2
(45) Date of Patent: May 2, 2017

(54) SENSOR WITH CONCURRENT DATA STREAMING USING VARIOUS PARAMETERS

(71) Applicant: QUALCOMM Incorporated, San Diego, CA (US)

(72) Inventor: Joseph Czompo, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 879 days.

(21) Appl. No.: 13/801,427

(22) Filed: Mar. 13, 2013

(65) Prior Publication Data

US 2014/0023096 A1    Jan. 23, 2014

Related U.S. Application Data

(60) Provisional application No. 61/672,659, filed on Jul. 17, 2012.

(51) Int. Cl.
*H04J 3/02*    (2006.01)
*H04Q 9/00*    (2006.01)

(52) U.S. Cl.
CPC ............... *H04J 3/025* (2013.01); *H04Q 9/00* (2013.01); *H04Q 2209/43* (2013.01); *H04Q 2209/47* (2013.01)

(58) Field of Classification Search
None
See application file for complete search history.

(56) References Cited

U.S. PATENT DOCUMENTS

| 5,216,633 | A   | * | 6/1993  | Weon      | G06F 21/79 340/5.65 |
|-----------|-----|---|---------|-----------|---------------------|
| 6,340,932 | B1  |   | 1/2002  | Rodgers et al. | |
| 7,982,600 | B2  | * | 7/2011  | Gavrila    | G08B 25/08 340/539.1 |
| 8,037,485 | B1  |   | 10/2011 | Goldman   | |
| 2001/0051850 | A1 | * | 12/2001 | Wietzke   | G01C 21/36 701/408 |
| 2006/0284979 | A1 |   | 12/2006 | Clarkson  | |
| 2007/0239399 | A1 |   | 10/2007 | Sheynblat et al. | |
| 2008/0133891 | A1 |   | 6/2008  | Salz et al. | |

(Continued)

FOREIGN PATENT DOCUMENTS

JP    2013513157 A    4/2013
WO   WO-2004086748 A2  10/2004

(Continued)

OTHER PUBLICATIONS

International Search Report and Written Opinion—PCT/US2013/049625—ISA/EPO—Oct. 8, 2013.

*Primary Examiner* — Kwang B Yao
*Assistant Examiner* — Adam Duda
(74) *Attorney, Agent, or Firm* — Kilpatrick Townsend & Stockton LLP

(57) ABSTRACT

Embodiments implement a device having a sensor element, where different data streams created as part of a sensor module integrated with the sensor element may create multiple sensor data streams from a single sensor element, and may concurrently convey information from the sensor element to respective different applications having different data parameter requirements such that the data streams each match the parameter requirements of the different applications.

8 Claims, 7 Drawing Sheets

(56) References Cited

U.S. PATENT DOCUMENTS

| | | | |
|---|---|---|---|
| 2009/0003599 A1 | 1/2009 | Hart et al. | |
| 2009/0224941 A1 | 9/2009 | Kansal et al. | |
| 2010/0073227 A1 | 3/2010 | Waters et al. | |
| 2010/0097464 A1 | 4/2010 | Volpe | |
| 2010/0304754 A1* | 12/2010 | Czompo | H04W 52/0254 455/456.1 |
| 2010/0318292 A1* | 12/2010 | Kulik | G01C 21/165 701/414 |
| 2011/0106477 A1 | 5/2011 | Brunner | |
| 2011/0125404 A1* | 5/2011 | Czompo | G01S 19/49 701/472 |
| 2011/0215952 A1 | 9/2011 | Aria et al. | |
| 2011/0244810 A1 | 10/2011 | Czompo | |
| 2012/0083911 A1 | 4/2012 | Louboutin et al. | |
| 2012/0096921 A1 | 4/2012 | Almalki et al. | |
| 2012/0101762 A1 | 4/2012 | Almalki et al. | |
| 2012/0158296 A1* | 6/2012 | Waters | G01C 21/16 701/509 |
| 2012/0203486 A1 | 8/2012 | Almalki et al. | |
| 2013/0006573 A1 | 1/2013 | Brunner et al. | |
| 2014/0023087 A1 | 1/2014 | Czompo | |

FOREIGN PATENT DOCUMENTS

| | | |
|---|---|---|
| WO | 2007118247 A2 | 10/2007 |
| WO | WO-2008014154 A2 | 1/2008 |
| WO | WO-2008090487 A1 | 7/2008 |
| WO | WO-2009105709 A1 | 8/2009 |
| WO | 2011068374 A2 | 6/2011 |
| WO | 2012052070 A1 | 4/2012 |

* cited by examiner

SENSOR WITH CONCURRENT DATA STREAMING USING VARIOUS PARAMETERS

CROSS-REFERENCE

This application claims priority from U.S. Provisional Patent Application No. 61/672,659 filed Jul. 17, 2012, entitled "SENSOR WITH CONCURRENT DATA STREAMING USING VARIOUS PARAMETERS, which is hereby incorporated by reference, as if set forth in full in this document, for all purposes.

BACKGROUND

Aspects of the disclosure relate sensors. In particular, devices, systems, and methods for sensors having multiple output data streams with different data stream parameters for the different output data streams from the same sensor. Particular embodiments integrated with a mobile device such as a smart phone where multiple applications operating on the smart phone request information with different data stream parameters from the same sensor are provided.

Current mobile phones are frequently integrated with sensors. Examples of sensors may be light sensors such as cameras, or movement sensors such as accelerometers. Such sensors as currently structured within mobile devices are capable of outputting a single sensor data stream. Additional manipulation of the data in the sensor data stream will then be performed as part of a separate function or application of the mobile device. The single sensor data stream may be copied and altered by a processor of the mobile device, but the sensor module itself outputs a single data stream.

As the power of mobile devices such as smart phones increase, greater and more diverse types of applications are operated on such mobile devices, and there is therefore a growing need for new and useful techniques and structures for providing sensor data for sensors integrated in mobile devices.

BRIEF SUMMARY

Various embodiments as described herein related to devices, systems, and methods for sensors having multiple output data streams with different data stream parameters for the different output data streams from the same sensor. For example, one embodiment may be a device comprising: a first sensor element; a plurality of digital filters coupled to the first sensor element by a signal multiplexing module; a plurality of output registers, each output register coupled to one corresponding digital filter of the plurality of digital filters; and a sensor addressing module coupled to the plurality of output registers, wherein the sensor addressing module concurrently outputs at least two sensor data streams, wherein the at least two sensor data streams are received at the sensor addressing module from the plurality of output registers, and wherein the at least two sensor data streams have different data stream parameters.

Another embodiment according to such a device may further comprise a processor communicatively coupled to the sensor addressing module that provides a first set of data stream parameters and a second set of data stream parameters which are used to create the different data stream parameters for the at least two sensor data streams.

Another embodiment according to such a device may additionally function where the processor executes a plurality of applications, each application of the plurality of applications providing a set of data stream parameters to the processor for communication to the sensor addressing module as part of a request for sensor data by each application of the plurality of applications.

Another embodiment according to such a device may further comprise a first calibration module; wherein the plurality of digital filters comprises a first digital filter and a second digital filter; wherein the plurality of output registers comprises a first output register coupled to the first digital filter and a second output register coupled to the second digital filter; and wherein the first digital filter is coupled to the first output register via the first calibration module.

Another embodiment according to such a device may further function where the first sensor element is a gyroscope sensor element and wherein the at least two sensor data streams comprise a calibrated sensor data stream and an uncalibrated sensor data stream. Another embodiment according to such a device may further comprise a first application of the plurality of applications is a camera application that receives the calibrated sensor data stream from the first output register and wherein a second application of the plurality of applications is a navigation application that receives the uncalibrated sensor data stream from the second output register.

Another embodiment according to such a device may further function where the signal multiplexing module further comprises an analog to digital converter and wherein the plurality of digital filters is integrated with the analog to digital converter. Another embodiment according to such a device may further function where the first sensor element is a microphone and wherein the signal multiplexing module and the plurality of digital filters are part of a single integrated circuit.

Another embodiment may be a method comprising: communicating sensor data directly from a sensor to a signal multiplexing module; outputting a first sensor data stream and a second sensor data stream from the signal multiplexing module; receiving the first sensor data stream at a first output register; receiving the second sensor data stream at a second output register;

receiving, at a sensor addressing module, a first request for the first sensor data stream; receiving, at the sensor addressing module, a second request for the second sensor data stream; and concurrently outputting at least a first portion of the first sensor data stream from the first output register and at least a second portion of the second sensor data stream from the second output register via the sensor addressing module.

Another embodiment according to such a method may further comprise communicating to the sensor addressing module from a processor as part of a first application, the first request for the first sensor data stream; and communicating to the sensor addressing module from the processor as part of a second application, the second request for the second sensor data stream.

Another embodiment according to such a method may further function where concurrently outputting at least the first portion of the first sensor data stream from the first output register and at least the second portion of the second sensor data stream from the second output register via the sensor addressing module comprises
communicating the first sensor data stream to the first application of the processor beginning at a first time and ending at a second time and communicating the second sensor data stream to the second application of the processor beginning at a third time and ending at a fourth time, wherein the third time is later than the first time and the third time is earlier than the second time.

Another embodiment according to such a method may further comprise receiving, at the sensor addressing module, a first query regarding available streams; receiving, at the sensor addressing module, a set of requested data stream parameters; and communicating a response to the first query regarding available streams, wherein the first request for the first sensor data stream is results from communication of the response to the first query.

Another embodiment according to such a method may further comprise communicating, from the sensor addressing module to a first digital filter associated with the first sensor data stream, the set of requested data stream parameters; and updating the first sensor data stream using the set of requested data stream parameters at the first digital filter prior to communicating the response to the first query. Another embodiment according to such a method may further comprise identifying that current parameters of the first sensor data stream match the set of requested data stream parameters prior to communicating the response to the first query.

An additional embodiment may be a non-transitory computer readable storage medium comprising computer readable instructions that, when executed by a processor coupled to the storage medium, cause a device to perform a method comprising: communicating sensor data directly from a sensor to a signal multiplexing module; outputting a first sensor data stream and a second sensor data stream from the signal multiplexing module; receiving the first sensor data stream at a first output register; receiving the second sensor data stream at a second output register; receiving, at a sensor addressing module, a first request for the first sensor data stream; receiving, at the sensor addressing module, a second request for the second sensor data stream; and concurrently outputting the first sensor data stream from the first output register and the second sensor data stream from the second output register via the sensor addressing module.

Another embodiment according to such a non-transitory computer readable storage medium may further function where the method further comprises: communicating to the sensor addressing module from the processor as part of a first application, the first request for the first sensor data stream; and
communicating to the sensor addressing module from the processor as part of a second application, the second request for the second sensor data stream. Another embodiment according to such a non-transitory computer readable storage medium may further function where the method further comprises: receiving, at the sensor addressing module, a first query regarding available streams; receiving, at the sensor addressing module, a set of requested data stream parameters; communicating, from the sensor addressing module to a first digital filter associated with the first sensor data stream, the set of requested data stream parameters; updating the first sensor data stream using the set of requested data stream parameters at the first digital filter; and communicating a response to the first query regarding available streams, wherein the first request for the first sensor data stream is results from communication of the response to the first query.

Another embodiment may be a device comprising: means for creating a plurality of sensor data streams from the sensor data; means for filtering each sensor data stream of the plurality of sensor data streams; and means for concurrently outputting the plurality of sensor data streams to at least one processor in response to one or more requests for the plurality of sensor data streams by applications operating on the at least one processor.

Additional embodiments of such a device may further comprise means for calibrating at least one of the plurality of sensor data streams, wherein the plurality of sensor data streams comprises a first calibrated data stream and a first uncalibrated data stream. Additional embodiments of such a device may further comprise means for executing a plurality of applications, wherein each application of the plurality of applications receives at least one of the plurality of sensor data streams.

While various specific embodiments are described, a person of ordinary skill in the art will understand that elements, steps, and components of the various embodiments may be arranged in alternative structures while remaining within the scope of the description. Also, additional embodiments will be apparent given the description herein, and thus the description is not referring only to the specifically described embodiments, but to any embodiment capable of the function or structure described herein.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
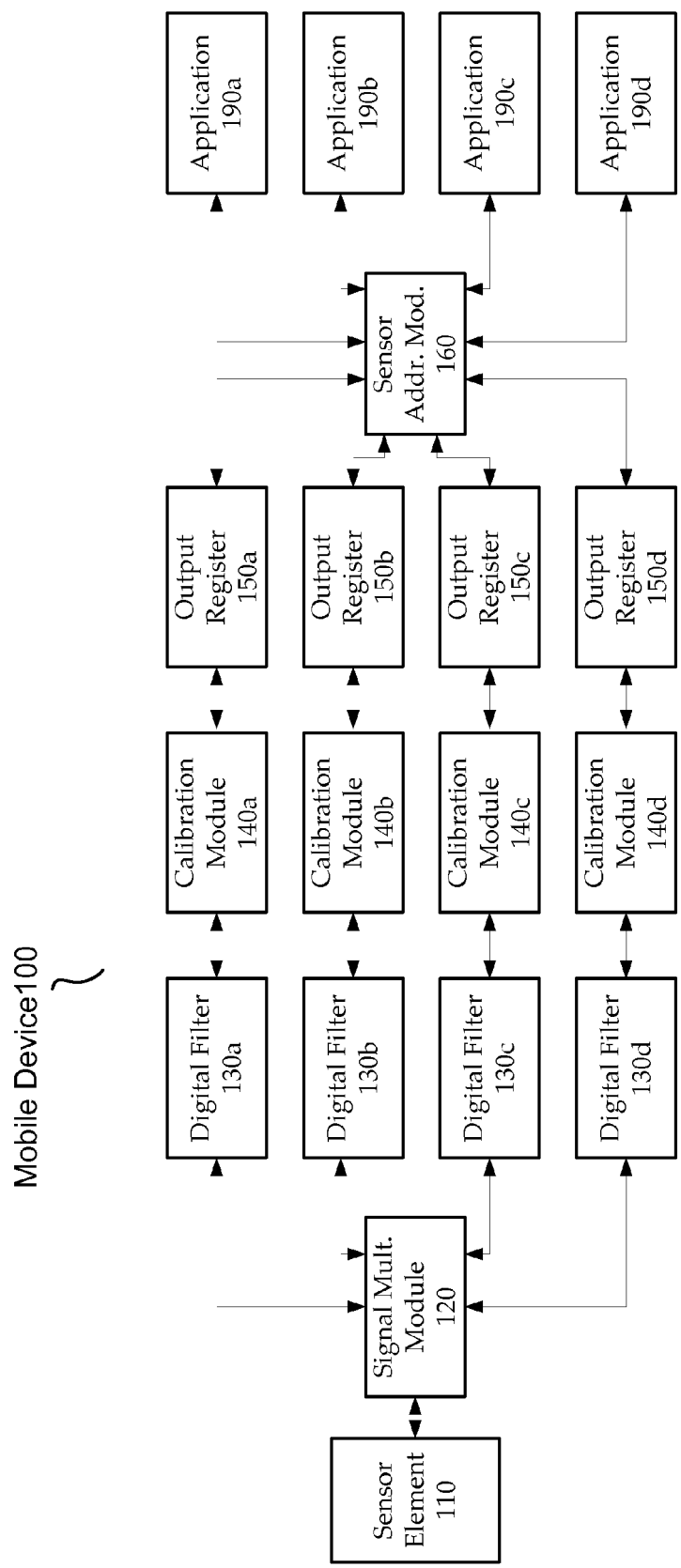
FIG. 1 shows a diagram of a device according one potential embodiment.

The present innovations relate to sensors and electronic devices with integrated sensors. In particular, devices are described which may integrate a sensor element with a processing device. The processing device may operate multiple applications concurrently, with each application requesting information from the sensor element. Various embodiments may function to provide concurrent and distinct sensor data streams that are tailored to different applications.

For example, in one potential embodiment, a smart phone having navigation and photography applications may operate the applications concurrently The navigation application may use data from a gyroscope sensor to assist with providing directions by measuring movement of the device and updating directions as the device moves. The photography application may use data from the gyroscope sensor for an image stabilization function. These two different uses may have differing requirements for the data. The image stabilization may function more effectively if a calibration factor is determined and corrected for continuously in real time. The navigation application on the other hand may require uncalibrated data because real-time calibration and correction may introduce discontinuities or jumps into the data which may degrade navigation performance. Additionally, the applications may require different data rates. Use of a single sensor data stream to provide data for both devices may therefore create inefficiencies and/or performance degradation in one or both of the applications. According to various embodiments, a first sensor data stream may be created with calibration factor correction for image stabilization in the photography application, and a second sensor data stream may be created with uncalibrated data for the navigation application, with each data stream having a data rate and/or other parameters tailored to the application.

As described herein, a "sensor element" refers to any component of a device used to measure a physical characteristic and output a signal that describes that characteristic. One example of a sensor element includes a camera and other light detecting elements that convert light into an electronic signal. Another example includes accelerometers and elements that measure movement. A further example is a global positioning receiver that receives satellite signals in order to output an electronic signal identifying a location of the receiver functioning as the sensing element. A sensor element may be any such transceiver or measuring element.

As described herein, a "module" refers to a set of components integrated as part of a device to perform functions as a unit. Modules may include circuitry, software, firmware, or any combination of these to perform various functions. For example, a wireless module may include an antenna, and any firmware and software for basic functionality in sending and receiving signals using the antenna.

As describe herein, a "sensor module" refers to a set of integrated components including a sensor element that outputs the signal describing the characteristic measured by a sensor element. Such components integrated with the sensor element may include active components that format and buffer the signal from the sensor element in forms usable by a processing element. Examples of such components include analog to digital converters that may convert an analog signal output from a sensor element into a digital signal usable by a general purpose computing processor to perform specific algorithms implemented as applications in a device including a sensor module. In various sensor modules, sensor elements may be integrated with circuit components to create integrated system on a chip structures that are fabricated and attached to a single integrated circuit die which is directly coupled to the sensing element. In other sensor modules, a printed circuit board may include various components with the sensing element directly coupled to the components using conductive lines in the printed circuit board.

As described herein, a "data stream" refers to information output over time. For example, certain sensor elements may function to constantly output an analog signal as measurements of a physical characteristic of the environment of the senor element are measured. The information being output as part of the constant output from the sensor element may be a sensor data stream. In various alternative embodiments, a data stream may be periodic, random, or associated with specific requests for information directed to a sensor module.

As described herein "concurrently output sensor streams" refers to multiple sensor streams for which data from at least a portion of each sensor stream is output at the same time as data from at least a portion of another sensor stream is output. The output of each sensor stream need not begin or end at the same time. This merely refers to data from a first sensor stream being output from a sensor module at the same time as data from a second sensor stream is output from a sensor module.

Referring to FIG. 1, mobile device 100 illustrates one potential non-limiting example of a device. Device 100 includes sensor element 110, signal multiplexing module 120, digital filters 130a-d, calibration modules 140a-d, output registers 150a-d, sensor addressing module 160, and applications 190a-d. Although four digital filters 130, four calibration modules 140, and four output registers 150 are shown, any number of two or more of some elements may be present in accordance with the various embodiments. Similarly, although four applications are shown in FIG. 1, any number of two or more applications may function in accordance with various embodiments.

Sensor element 110 may be any sensing device integrated with device 100. For example, a sensor element may be a gyroscope, an accelerometer, a magnetometer, a charge coupled device (CCD), a photovoltaic cell, any light sensing device, a temperature sensing device, a pressure sensing device, or any other potential sensing device or element.

Signal multiplexing module 120 may convert sensor data from sensor element 110 into multiple streams of data for use by multiple digital filters 130 as separate signals. For example, signal multiplexing 120 may comprise an analog to digital converter for sensor elements that create analog data, and may further comprise various other settings to enable the creation of multiple signals. In various embodiments an analog to digital converter may first convert an analog signal into a digital signal, and then multiple copies of the digital signal may be created. In alternative embodiments, multiple analog signals may be created.

Digital filters 130 may comprise hardware digital filters that may be configurable to adjust various parameters of a data stream associated with each corresponding digital filter 130. For example, a filtering frequency may be set by digital filter, along with a sampling rate and measurement rage. Such settings may be communicated directly to digital filter 130 by sensor addressing module, or may be communicated to digital filter 130 by any appropriate signal path. In various embodiments, digital filters 130 may alternatively comprise firmware, hardware, software, or any combination in or to implement any kind of digital manipulation or digital processing on a sensor source data stream.

Calibration modules 140 may function to modify various data streams with calibration data. In one potential embodiment, each calibration module 140 comprises a memory that stores calibration data. Such calibration data may be created as part of an operation of a device, where a known input is provided to sensor element 110, and the output of sensor element 110 is compared with the values of the known input to create calibration data. The calibration data may then be stored for use by calibration modules 140. Similar to the function of digital filters 130, calibration modules 140 may have an input to receive a command directly from sensor addressing module 160 to modify an associated data stream using the calibration data or not to modify the associated data stream using the calibration data. Such an input may comprise a direct signal from sensor addressing module 160, or an input via any other possible path for a command input to calibration module 140. In various embodiments, calibration modules 140 may be implemented in hardware, firmware, software, or any combination of these. Calibration modules 140 may thus be implemented using memory that stores calibration data, and may further comprise or be connected to one or more processors that use the calibration data to create a calibrated data stream from a source data stream.

In various embodiments, calibration data may be created in a factory setting, where all units are compared with a known sensing target in order to compensate for variations in sensor output measurements. In alternate embodiments, a device user may perform a calibration routine as part of a calibration application in the device to update calibration parameters. In still further embodiments, a device may include automated calibration routines that continuously or periodically implement an automated calibration or calibration update to create a real or near real-time calibration.

Output data register 150 may then store data for an associated data stream from the respective digital filter 130 and calibration module 140. Such a register may be any acceptable data storage device or memory. When an application 190 requests information from sensor element 110, it may request such information by directly addressing a specific output register 150 in a communication with sensor addressing module 160, or it may simply request a data stream with a set group of parameters, and allow sensor addressing module 160 to request data from an output register 150 after verifying that digital filter 130 and calibration module 140 for the corresponding output register 150 match the parameters as closely as possible.

In additional alternative embodiments, sensor addressing module 160 may further include elements for creation of additional data streams. For example, if six different data streams are requested from the sensor element 110, addressing module 160 may comprise firmware, hardware, or software for creating additional data streams from the data streams in output data registers 150. Sensor addressing module may further be able to create multiple output streams from a single stream in an output data register, and modify one or more of the multiple data streams by adjusting a calibration, a sampling rate, a bandwidth, or any other such data stream parameter. In such embodiments, a sensor addressing module 160 may include or be connected to a memory element or memory module that stores calibration data, and may further include or be connected to a processing element or processing module. Sensor addressing module may then output multiple data streams with different parameters using a data stream from a single output data register such as output data register 150*a*.

Figure 2:
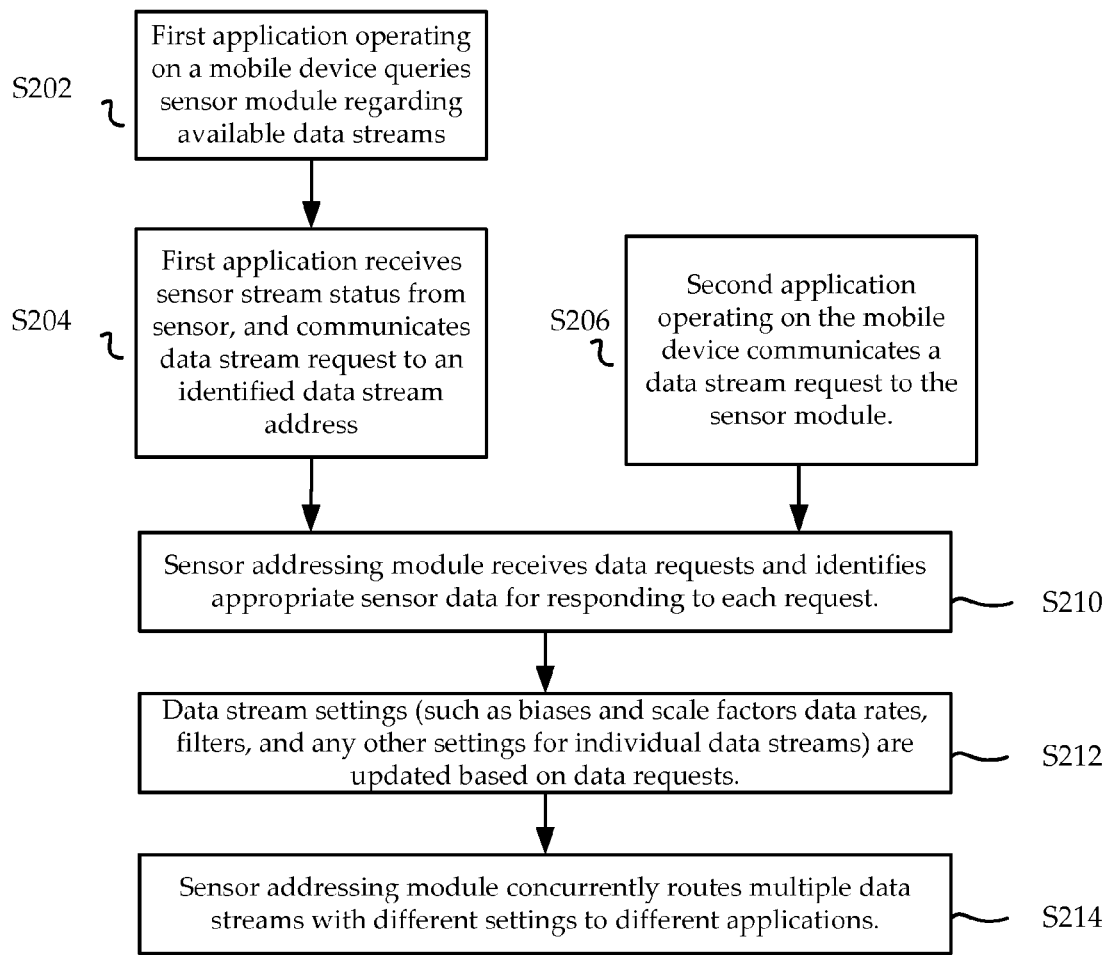
FIG. 2 illustrates a method according to some embodiments.

FIG. 2 describes a method of implementing an embodiment. In step S202 a first application 190*a* may request information regarding available data streams from sensor element 110. Such a query may attempt to identify unused data streams which may have parameters adjusted to match the preferences of the first application, or may provide a set of preferred parameters with a request to identify whether a data stream conforming to the identified parameters is available. In step S204, the first application 190*a* may receive a communication from sensor addressing module 160 identifying the availability of a data stream, and application 190*a* may communicate the request for the data along with the parameters.

In step S206 a second application 190*b* operating in a device 100 may request sensor data and identify a set of parameters. Unlike application 190*a*, second application 190*b* may have no integrated system for acknowledging that multiple streams of data may exist. Instead, another module such as sensor addressing module 160 may receive the request, identify the availability of an appropriate data stream, set the corresponding digital filter 130 and calibration module 140 settings based on the request from application 190*b*, and communicate the data stream to application 190*b* in a way that is transparent to application 190*b*. These requests in S204 and S206 may occur at the same time, or may initially occur at separate times, such that one data stream may exist at the time another data stream is created in response to a request for sensor data. In various alternative embodiments, all or any combination of applications may function in a manner similar to that of application 190*a* described above. In other alternative embodiments, all or any combination of applications may function in a manner similar to that of application 190*b*. Additionally, in still further embodiments, any number of two or more applications may function within a device with concurrent data streams.

In step S210, the sensor addressing module 160 may receive any data requests, and identify appropriate sensor data for responding to each request. Such identification may simply identify an output register identified by the application, or may match provided parameters with available data streams. In step S212, any necessary updates to calibration selections (relating to e.g. biases and scale factors), data rates, frequency filters, or any other settings may be updated for a particular data stream based on a data request. In step S214, after the appropriate data streams are set based on the requested parameters, sensor addressing module 160 may concurrently route the data stream to the corresponding appropriate application. For example, if digital filter 130*d* and calibration module 140*d* are set using parameters provided by application 190*a*, and if digital filter 130*a* and calibration module 140*a* are set to match parameters provided by application 190*b*, then the data from output register 150*d* may be sent to application 190*a* concurrently with the data from output register 150*a* being sent to application 190*b*.

Such a system may operate with a first data stream being sent continuously, while a second data stream starts and stops repeatedly in response to various application requests. Such a system may further operate with any number of additional data streams being sent concurrently, and with additional data streams starting and ending while other data streams operate, with each data stream having a different set of parameters. Further, in certain embodiments, certain applications may be sent the same data stream or different data streams having the same parameters, while multiple additional applications receive a concurrently transmitted data stream having different parameters.

In various alternative embodiments, a combination of parameters such as a data rate, inclusion of calibration parameters, and adjustment of dynamic value ranges, a data rate, a data calibration, a data output range, a data output resolution, a sampling rate, a measurement range, a filtering frequency, or any other such parameter may be used. Such parameters may be set by digital filter 230*b*, calibration module 240, or any other additional module.

An additional potential example of an embodiment may now be described. In one potential embodiment, sensor addressing module 160 may contain information that the data stream associated with output register 150*a* includes calibrated data with a sampling rate of 20 Hz and output register 150*b* includes uncalibrated data with a sampling rate of 100 Hz. If an application 190*c* requests calibrated data at a sampling rate of 20 Hz, the information from output register 150*a* by simply be sent to application 190*c*. If application 190*d* requests uncalibrated data at 200 Hz, the digital filter 130*b* may be modified to adjust the sampling rate, and when the data in output register 150*b* has been adjusted to match the parameter request from application 190*d*, the data may be sent to application 190*d*.

As described by FIG. 2, one potential implementation of negotiating parameters for an application requesting sensor data is to query a sensor module for available streams. In various alternative embodiments, an application may send a request for a data stream having certain parameters. The sensor addressing module may receive such a request, and identify whether a stream with current parameters equal to the requested parameters exist. If a data stream with currently parameters equal to the requested parameters does exist, the sensor addressing module may respond either by communicating the data stream to the application, or by identifying the data stream. The parameters for that data stream may then be fixed until released by the application. Alternatively, a communication may be sent to the application prior to a later update of the parameters for that data stream, indicating that the data stream will no longer match the requested parameters.

If a data stream having current parameters equal to the requested parameters does not exist, the sensor addressing module may identify an available data stream and communicate with the filters and/or calibration modules associated with that data stream to update the data stream to parameters that match the requested data stream. The data stream or an identifier associated with the data stream may then be sent to the requesting application. If all data streams are in use and none of the data streams match the requested data stream parameters, an indication that no data stream is available may be sent in response to the request for the data stream having the set of data stream parameters.

Figure 3:
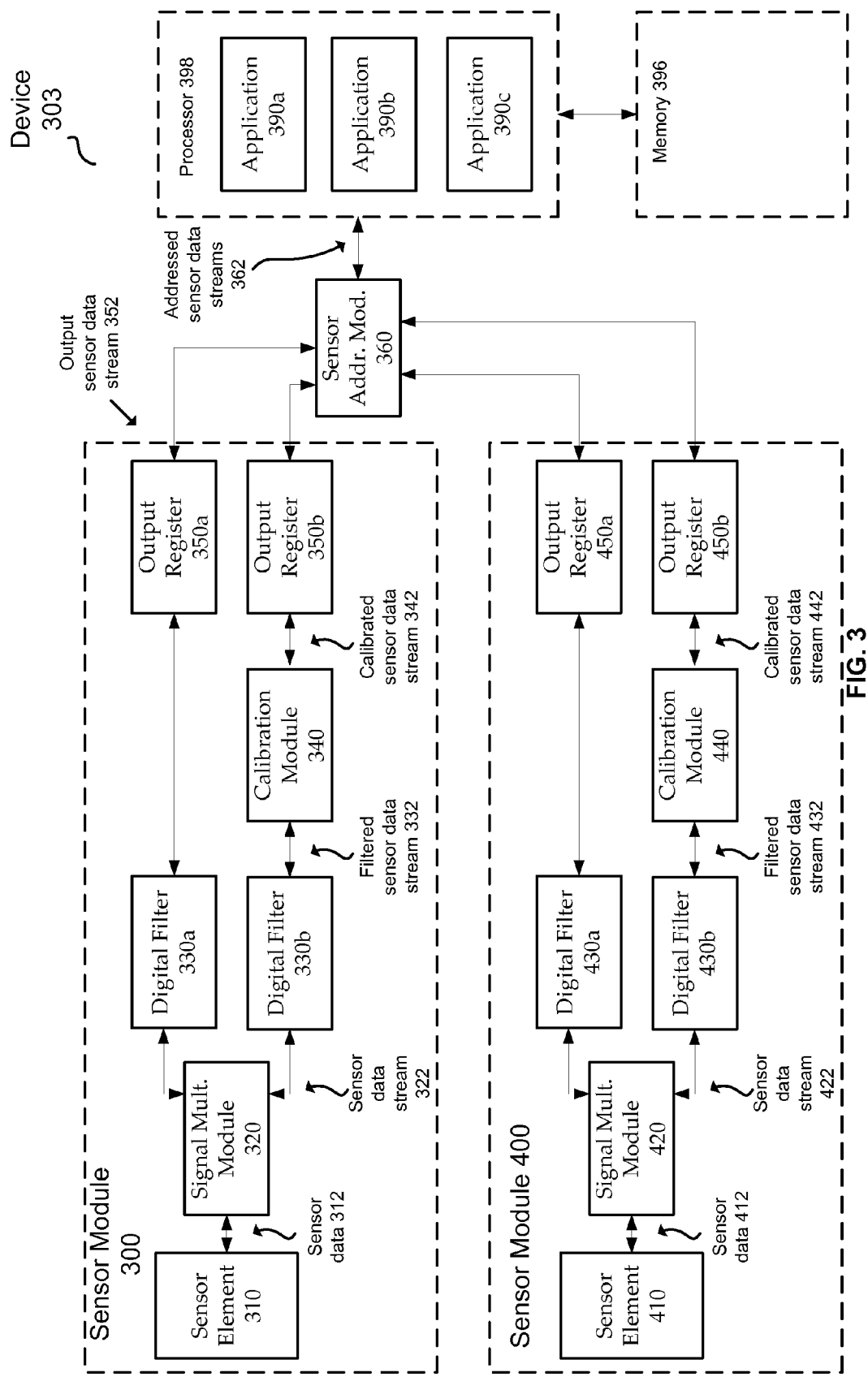
FIG. 3 shows a diagram of a device according one potential embodiment.

FIG. 3 describes another example of a device according to another potential embodiment. Device 303 of FIG. 3 includes a first sensor module 300, a second sensor module 400, a sensor addressing module 360, a processor 398, and a memory 396. Sensor module 300 includes sensor element 310, signal multiplexing module 320, digital filters 330*a-d*, calibration module 340*a*, and output registers 350*a-b*. Sensor module 400 includes sensor element 410, signal multiplexing module 420, digital filters 430*a-b*, calibration module 440, and output registers 450*a-b*. Sensor module 300 and sensor module 400 may be different types of sensor modules. For example, sensor module 300 may function as a gyroscope module and sensor module 400 may function as a camera module. In alternate embodiments, these sensor modules may be redundant modules that perform the same function.

In the embodiment of FIG. 3, signal sensor addressing module 360 routes sensor data and requests for sensor data both between sensor module 300 and processor 398 and between sensor module 400 and processor 398. Thus in certain embodiments, a single sensor addressing module may function to enable addressing of multiple sensor modules. In alternate embodiments, each sensor module may have a separate sensor addressing module with may be integrated as part of the sensor module.

Further, as shown by FIG. 3, applications 390*a*, 390*b*, and 390*c* operate as executed by processor 398 in conjunction with non-transitory storage memory 396. Such applications may function as executed by processor 398 to request sensor data from sensor modules 300 and 400, and may store such sensor data for use within memory 396 as part of each application.

FIG. 3 further shows signal paths for sensor data and sensor data streams derived from sensor elements 310 and 410. For example, sensor data 312 is output from sensor element 312 directly to signal multiplexing module 320. Signal multiplexing module 320 outputs sensor data stream 323 and sensor data stream 322, which are created using sensor data 412. Signal multiplexing module 320 may essentially be considered as outputting data streams along separate hardware or circuitry paths, each of which has an output register 350 for storing and managing output of a sensor data stream. While filtering and calibration adjustments may be made to a particular sensor data stream prior to that stream being managed by an output register, the signal received at the register is still considered to be the same sensor data stream despite any changes made to set certain data stream parameters on the sensor data stream.

For example as shown in FIG. 3, sensor data stream 322 may be modified by digital filter 330*b* to create a filtered sensor data stream 332, which may further be modified by calibration module 340 to create a calibrated sensor data stream 342 which is input to output register 350*b*, but the calibrated filtered sensor data stream received at output register 350 is still considered to be sensor data stream 322. Similarly, sensor module 400 is shown having sensor data 412, sensor data stream 423, sensor data stream 422, filtered sensor data stream 432, and calibrated sensor data stream 442.

Figure 4:
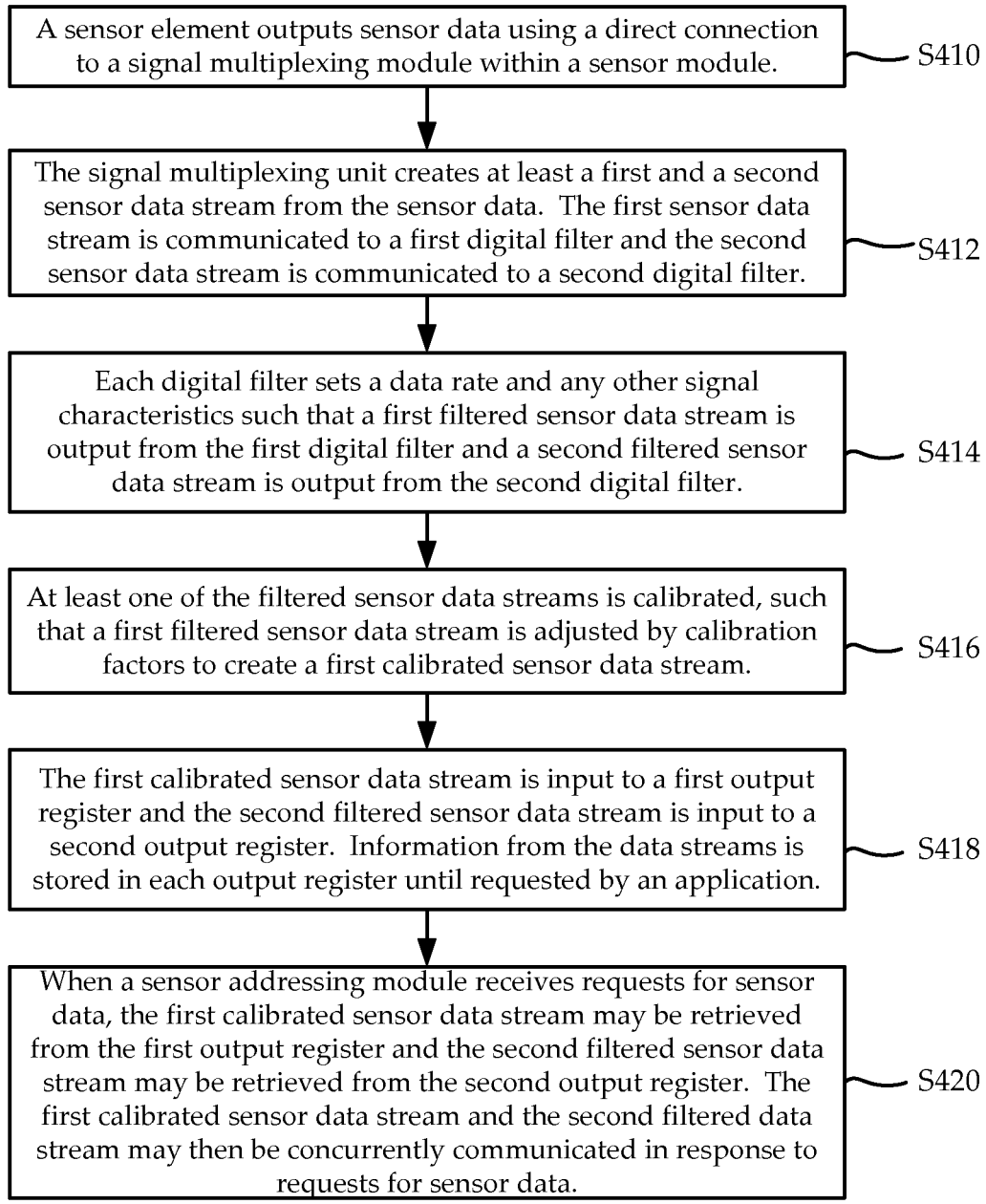
FIG. 4 illustrates a method according to some embodiments.

FIG. 4 then describes an additional alternative method according to certain embodiments. In S410, a sensor element such as sensor element 310 or sensor element 410 outputs sensor data using a direct connection to a signal multiplexing module within a sensor module. Such a direct connection may include a conductive path within a system on a chip, a conductive wire or line as part of a circuit board, conductive portions of circuit packaging, conductive lines as portions of switches, or any other path directly from the sensor element to the multiplexing module with minimal or no extra functionality separating the two components.

In S412, the signal multiplexing unit creates at least a first and a second sensor data stream from the sensor data. The first sensor data stream is communicated to a first digital filter and the second sensor data stream is communicated to a second digital filter. This essentially begins a separate hardware circuitry path for sensor data streams from the same sensor element.

In S414, each digital filter sets a data rate and any other signal characteristics such that a first filtered sensor data stream is output from the first digital filter and a second filtered sensor data stream is output from the second digital filter. In S416, at least one of the filtered sensor data streams is calibrated, such that a first filtered sensor data stream is adjusted by calibration factors to create a first calibrated sensor data stream. For sensor modules which may be highly optimized around the need for a calibrated and an uncalibrated data stream, especially if significant resources or processing is required for calibration, a sensor module having a single hardware circuitry path for a sensor data stream with a calibration module such as calibration module 340 may provide the required multiple data streams in an efficient manner.

In S418 the first calibrated sensor data stream is input to a first output register and the second filtered sensor data stream is input to a second output register. Information from the data streams is stored in each output register until requested by an application.

In S420, when a sensor addressing module receives requests for sensor data, the first calibrated sensor data stream may be retrieved from the first output register and the second filtered sensor data stream may be retrieved from the second output register. The first calibrated sensor data stream and the second filtered data stream may then be concurrently communicated in response to requests for sensor data.

Figure 5:
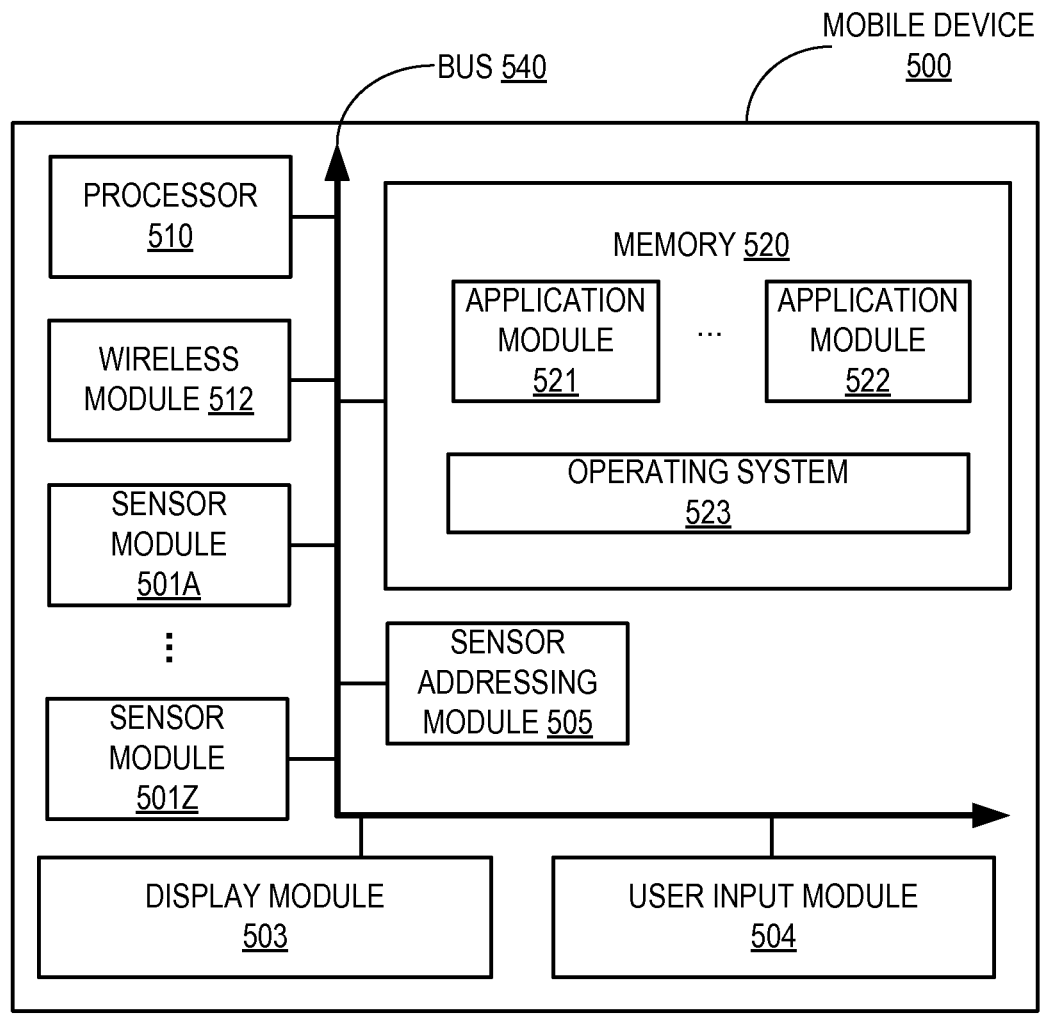
FIG. 5 shows a diagram of a mobile device according one potential embodiment.

FIG. 5 is block diagram illustrating one potential embodiment of a mobile device that may be used in conjunction with embodiments described herein. Such mobile devices include sensor modules and functionality with single sensor elements within a sensor module capable of outputting concurrent sensor data streams. Such a mobile device may also execute applications as described in conjunction with various embodiments, such that the applications may request sensor data having different data stream parameters from a single sensor module. Mobile device 500 of FIG. 5, may be any mobile device such as a smart phone, cellular phone, personal digital assistant, tablet computer, personal media player as well as any other type of portable electronic device offering similar or combined functionality. It should be appreciated that device 500 may also include tactile buttons, a power device (e.g., a battery), as well as other components associated with a portable electronic device such as a smart cellular telephone. Accordingly, FIG. 5 is not to be construed as limiting because some components are omitted.

In the embodiment shown at FIG. 5, device 500 includes processor 510 configured to execute instructions for performing operations at a number of components and can be, for example, a general-purpose processor or microprocessor suitable for implementation within a portable electronic device. Processor 510 is communicatively coupled with a plurality of components within mobile device 500. To realize this communicative coupling, processor 510 may communicate with the other illustrated components across a bus 540. Bus 540 can be any subsystem adapted to transfer data within mobile device 500. Bus 540 can be a plurality of computer buses and include additional circuitry to transfer data.

Memory 520 may be coupled to processor 510. In some embodiments, memory 520 offers both short-term and long-term storage and may in fact be divided into several units. Memory 520 may be volatile, such as static random access memory (SRAM) and/or dynamic random access memory (DRAM) and/or non-volatile, such as read-only memory (ROM), flash memory, and the like. Furthermore, memory 520 can include removable storage devices, such as secure digital (SD) cards. Thus, memory 520 provides storage of computer readable instructions, data structures, program modules, and other data for mobile device 500. In some embodiments, memory 520 may be distributed into different hardware modules.

In some embodiments as described above, mobile device 500 may have a single sensor addressing module 505 for addressing output buffers containing sensor data within each sensor module, whereas in alternate embodiments, each module may have a separate addressing module.

In some embodiments, memory 520 stores a plurality of application modules 521-522. Application modules 521-522 contain particular instructions to be executed by processor 510. Memory 520 can store any number of application modules. A respective one of application modules 521-522 can be, for example, a calendar application, a geo-fencing application, a power management application, a smart alert application, a social media application (e.g., Twitter™ or Facebook™), or any application-type module having instructions to be executed by processor 510. Any such applications may access sensor data by communicating a request for sensor data or a sensor data stream to a sensor addressing module 505. In some embodiments, memory 520 includes an operating system 523. Operating system 523 may be operable to initiate the execution of the instructions provided by application modules 521-522 and/or manage sensor modules 501. Operating system 523 may be adapted to perform other operations across the components of device 500 including threading, resource management, data storage control and other similar functionality.

In some embodiments, mobile device 500 includes one or more wireless modules 512. Wireless modules 512 may include a Wi-Fi transceiver, a transceiver for communicating with cellular telephone towers, or any other such module for implementing wireless communications.

Additionally, in some embodiments, mobile device 500 includes a plurality of sensor modules 501A-501Z. Each sensor module 501 is a physical module within device 500. However, while each of modules 501 is permanently configured as a structure, a respective one of modules 501 may be temporarily configured to perform specific functions or temporarily activated. A common example is an application module that may program a camera module (i.e., sensor module) for shutter release and image capture that is activated for image capture and deactivated after image capture, or activated for creation of a sensor data stream in the form of a video capture stream, and deactivated when capture of the video data is complete. Further, in addition to sensor modules 501, and number of additional hardware modules with particular functionality may be included within mobile device 500. A respective one of modules 501 can be, for example, an accelerometer, a satellite navigation system receiver (e.g., a GPS module), a pressure module, a temperature module, an audio output and/or input module (e.g., a microphone), a camera module, a proximity sensor, an alternate line service (ALS) module, a capacitive touch sensor, a near field communication (NFC) module, a Bluetooth transceiver, a cellular transceiver, a magnetometer, a gyroscope, an inertial sensor (e.g., a module the combines an accelerometer and a gyroscope), an ambient light sensor, a relative humidity sensor, or any other similar module operable to provide sensory output and/or receive sensory input. In some embodiments, one or more functions of the sensor modules 501 may be implemented in software.

In addition to sensor modules 501 and application modules 521-522, mobile device 500 may have a display module 503 and a user input module 504. Display module 503 graphically presents information from device 500 to the user. This information may be derived from one or more application modules 521-522, one or more sensor modules 501, a combination thereof, or any other suitable means for resolving graphical content for the user (e.g., by operating system 524). Display module 503 can be liquid crystal display (LCD) technology, light emitting polymer display (LPD) technology, or some other display technology. In some embodiments, display module 503 is a capacitive or resistive touch screen and may be sensitive to haptic and/or tactile contact with a user. In such embodiments, the display module 503 can comprise a multi-touch-sensitive display.

Figure 7:
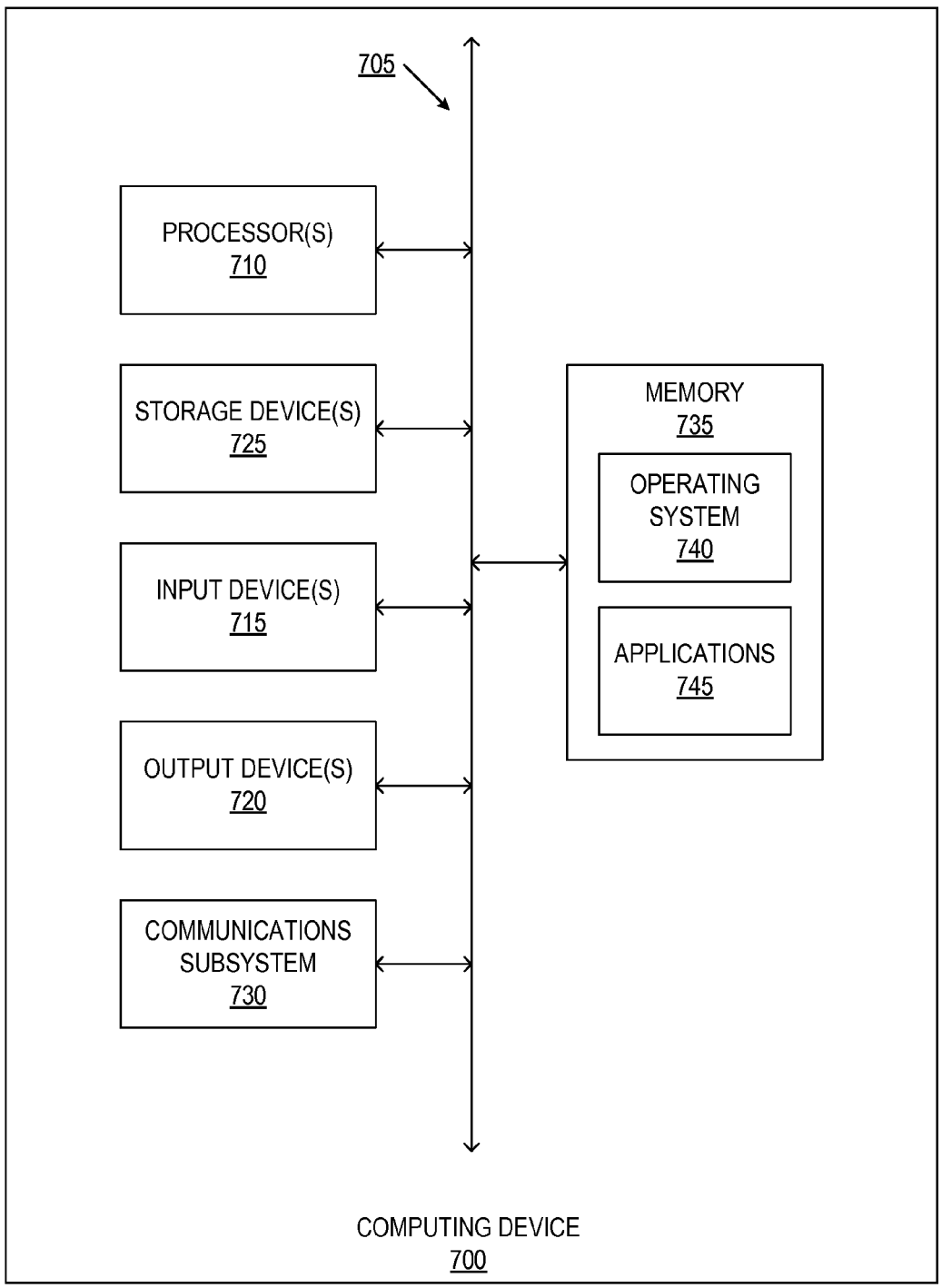
FIG. 7 illustrates an example computing system in which one or more aspects of the disclosure may be implemented.

Additional embodiments of a mobile device may further comprise various portions of computing devices as are detailed below with respect to FIG. 7.

Figure 6:
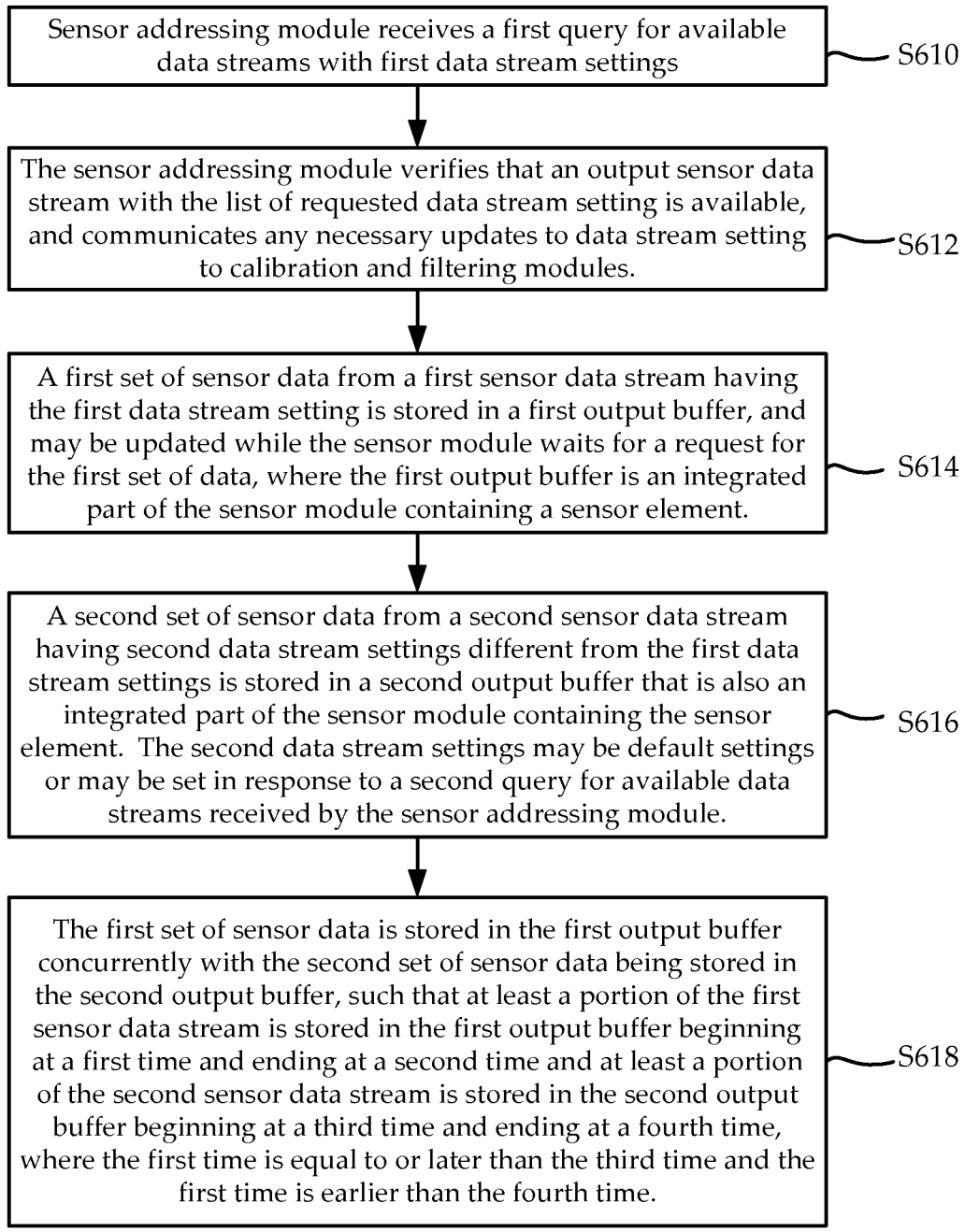
FIG. 6 illustrates a method according to some embodiments.

FIG. 6 describes an additional alternative method according to a potential embodiment. In particular, FIG. 6 describes that in certain embodiments, a single sensor module having a single sensor element may create and store multiple sensor data streams having different data stream parameters prior to a request for the different sensor data streams, such that multiple sensor data streams maybe concurrently stored in output buffers of a sensor module in preparation for a request for sensor data from the sensor module from one or more applications operating on a mobile device which includes the sensor module.

In S610, sensor addressing module receives a first query for available data streams with first data stream settings. In S612, the sensor addressing module verifies that an output sensor data stream with the list of requested data stream setting is available, and communicates any necessary updates to data stream setting to calibration and filtering modules.

In S614, a first set of sensor data from a first sensor data stream having the first data stream setting is stored in a first output buffer, and may be updated while the sensor module waits for a request for the first set of data, where the first output buffer is an integrated part of the sensor module containing a sensor element.

In S616 second set of sensor data from a second sensor data stream having second data stream settings different from the first data stream settings is stored in a second output buffer that is also an integrated part of the sensor module containing the sensor element. The second data stream settings may be default settings or may be set in response to a second query for available data streams received by the sensor addressing module.

In S618 a first set of sensor data is stored in the first output buffer concurrently with the second set of sensor data being stored in the second output buffer, such that at least a portion of the first sensor data stream is stored in the first output buffer beginning at a first time and ending at a second time and at least a portion of the second sensor data stream is stored in the second output buffer beginning at a third time and ending at a fourth time, where the first time is equal to or later than the third time and the first time is earlier than the fourth time.

An example of a computing system in which various aspects of a device having one or more sensor elements and that operates a plurality of applications concurrently may be implemented will now be described with respect to FIG. 7. According to one or more aspects, a computer system as illustrated in FIG. 7 may be incorporated as part of a computing device, which may implement, perform, and/or execute any and/or all of the features, methods, and/or method steps described herein. For example, computer system 700 may represent some of the components of a hand-held device. A hand-held device may be any computing device with an input sensory unit, such as a camera and/or a display unit. Examples of a hand-held device include but are not limited to video game consoles, tablets, smart phones, televisions, and mobile devices. In one embodiment, the system 700 is configured to implement any of the methods described above. FIG. 7 provides a schematic illustration of one embodiment of a computer system 700 that can perform the methods provided by various other embodiments, as described herein, and/or can function as the host computer system, a remote kiosk/terminal, a point-of-sale device, a mobile device, a set-top box, and/or a computer system. FIG. 7 is meant only to provide a generalized illustration of various components, any and/or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a camera, a mouse, a keyboard and/or the like; and one or more output devices 720, which can include without limitation a display unit, a printer and/or the like. In some embodiments, the one or more processor 710 may be configured to perform a subset or all of the functions described above with respect to FIGS. 1 and 2. For example, as described above any combination of applications 190a-d may be implemented using one or more processors 710. The processor 710 may comprise a general processor and/or and application processor, for example. In various embodiments, the processor is integrated into an element that processes camera inputs, gyroscope inputs, or other sensor element input that may be modified by additional elements such as analog to digital converters or digital data outputs such as digital data output 120.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 700 might also include a communications subsystem 730, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 730 may permit data to be exchanged with a network (such as the network described below, to name one example), other computer systems, and/or any other devices described herein. In many embodiments, the computer system 700 will further comprise a non-transitory working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 2, might be implemented as code and/or instructions executable by a computer (and/or a processor within a computer); in an aspect, then, such code and/or instructions can be used to configure and/or adapt a general purpose computer (or other device) to perform one or more operations in accordance with the described methods. The processor 710, memory 735, operating system 740, and/or application programs 745 may be used to implement various blocks described with respect to FIGS. 1-2.

A set of these instructions and/or code might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein, for example methods described with respect to FIGS. 1-2.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communications subsystem 730 (and/or the media by which the communications subsystem 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A device comprising:
   a first sensor element;
   a plurality of digital filters, each of the digital filters coupled in parallel with each other to the first sensor via a signal multiplexer, wherein the plurality of digital filters comprises more than one digital filter;
   a plurality of output registers, each output register coupled to one corresponding digital filter of the plurality of digital filters; and
   a sensor addresser coupled to the plurality of output registers, wherein the sensor addresser concurrently outputs at least two sensor data streams, wherein the at least two sensor data streams are received at the sensor addresser from the plurality of output registers, and wherein the at least two sensor data streams have different data stream parameters.

2. The device of claim 1 further comprising:
   a processor communicatively coupled to the sensor addresser that provides a first set of data stream parameters and a second set of data stream parameters which are used to create the different data stream parameters for the at least two sensor data streams.

3. The device of claim 2 wherein the processor executes a plurality of applications, each application of the plurality of applications providing a set of data stream parameters to the processor for communication to the sensor addresser as part of a request for sensor data by each application of the plurality of applications.

4. The device of claim 3 further comprising a first calibration module;
   wherein the plurality of digital filters comprises a first digital filter and a second digital filter;
   wherein the plurality of output registers comprises a first output register coupled to the first digital filter and a second output register coupled to the second digital filter; and
   wherein the first digital filter is coupled to the first output register via the first calibration module.

5. The device of claim 4 wherein the first sensor element is a gyroscope sensor element and wherein the at least two sensor data streams comprise a calibrated sensor data stream and an uncalibrated sensor data stream.

6. The device of claim 5 wherein a first application of the plurality of applications is a camera application that receives the calibrated sensor data stream from the first output register and wherein a second application of the plurality of applications is a navigation application that receives the uncalibrated sensor data stream from the second output register.

7. The device of claim 1 wherein the signal multiplexer-further comprises an analog to digital converter and wherein the plurality of digital filters is integrated with the analog to digital converter.

8. The device of claim 7 wherein the first sensor element is a microphone and wherein the signal multiplexer and the plurality of digital filters are part of a single integrated circuit.

* * * * *